May 6, 1952 R. R. BAYUK ET AL 2,595,222
AUTOMATIC LIQUID EXTRACTION VALVE FOR GAS STORAGE TANKS
Filed Jan. 21, 1948
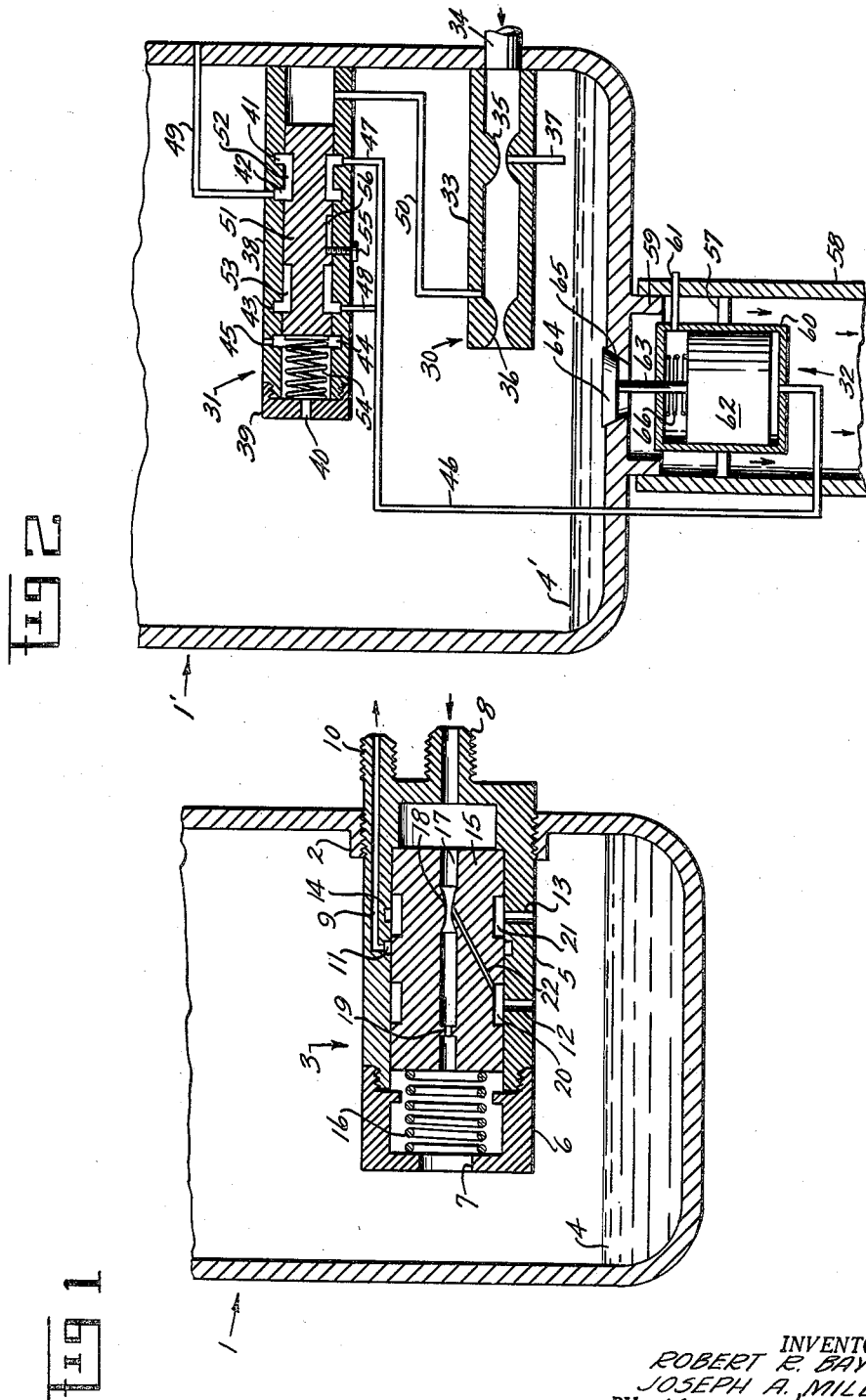
INVENTORS.
ROBERT R. BAYUK
JOSEPH A. MILETI
BY
ATTORNEY
AGENT Patented May 6, 1952

2,595,222

UNITED STATES PATENT OFFICE 2,595,222

AUTOMATIC LIQUID EXTRACTION VALVE FOR GAS STORAGE TANKS

Robert R. Bayuk and Joseph A. Mileti, Jr., Dayton, Ohio

Application January 21, 1948, Serial No. 3,381

10 Claims. (Cl. 137—103)

(Granted under the act of March 3, 1883, as amended April 30, 1928; 370 O. G. 757)

The invention described herein may be manufactured and used by or for the United States Government for governmental purposes without payment to us of any royalty thereon.

The present invention relates to an automatic liquid extraction valve for use in or with a compressed gas storage tank.

The primary object of the invention is to provide a liquid extraction valve or liquid segregator for installation in a compressed gas tank, reservoir or accumulator and capable of responding to the presence of an appreciable quantity of liquid to effect automatic extraction or expulsion thereof from the gas tank.

A further object of the invention is to provide an automatic liquid extraction device for attachment in or to a gas storage tank and including means to effect extraction of liquid from the tank even though the tank assumes various relative positions, as determined by the flight of an aircraft on which the tank is carried.

Another object of the invention is to provide an automatic liquid extraction device for attachment in or to a gas storage tank and including a valve which is so constructed as to cause extraction from the tank of liquid accumulations without allowing escape of any appreciable quantity of compressed gas from the tank.

Another object of the invention is to provide an automatic liquid responsive valve device which is simple and reliable, and which possesses adaptability for application in various fluid storage and fluid circulating systems.

A further object of the invention is to generally improve the construction of and extend the field of usefulness of automatic valves and automatic liquid extraction devices.

The above and other objects of the invention will become apparent upon reading the following detailed description of the invention in conjunction with the accompanying drawing, in which:

Fig. 1 is a vertical cross sectional view taken through the lower portion of a gas storage tank and showing the liquid extraction valve installed within the tank, and Fig. 2 is a vertical cross sectional view taken through the lower portion of a gas storage tank and showing another form of the liquid extraction valve installed in the tank.

For a description of the preferred embodiment of the invention reference is made to Fig. 1, wherein there is shown part of a tank 1 used to hold a gas, such as compressed air for example. One side wall of the tank is provided with an internally-threaded circular flange 2 to receive the valve assembly 3. While the tank 1 has most of its volume taken up by gas, there is also a small amount of liquid 4 therein which will of course gravitate to the lowest portion of the tank. In the present example where the gas is compressed air the liquid is largely water condensed from the vapor taken into the air compressor from the atmosphere. In addition there will be a small proportion of oil picked up by the air from the air compressor. Gradually the liquid level rises in the tank until it reaches the valve assembly 3, which will now be described in detail.

The valve assembly 3 comprises a casing or cylinder 5 which threads into the wall flange 2 and which is partially closed at the end housed within the tank by means of a cap 6 having a screw threaded connection with the cylinder, and having an aperture 7 to allow free passage of gas or compressed air into the tank. At the other or outside end of the cylinder there is provided a gas line connection 8, to which is secured (as by screw threads) a compressed air supply line or other gas line. The wall of cylinder 5 is also provided with a liquid outlet passage 9 ending in a liquid outlet connection 10. At the inner end of passage 9 there is also provided an annular liquid receiving groove 11 formed in the wall of cylinder 5. At the lowest point thereof the wall of cylinder 5 is provided with a pair of spaced apertures 12 and 13. The cylinder wall is also provided with an annular groove 14, which connects with the aperture 13.

Slidably mounted within the cylinder is a valve member or piston 15. The valve member is normally retained in the forward or outer position as shown (Fig. 1) by means of a compression spring 16, while the extent of sliding movement of the member 15 is determined by the shoulders formed on the wall of the cylinder 5 and cap 6 respectively. The member 15 is provided with an axial passage 17 for the flow of compressed air into the tank 1. Near the outer end of this passage there is a Venturi formation 18, and near the inner end there is a constriction 19. Around the outside the member 15 is provided with two spaced annular grooves 20 and 21, the former one of which connects by a narrow passage 22 with the throat of Venturi 18.

Considering now the mode of operation of the automatic valve it may be seen that in Fig. 1 the compressed air or other gas is entering at fitting or connection 8 into the cylinder 5 and thence through passage 17 and aperture 7 to the interior of tank 1. As the air enters it brings some water and oil which gradually accumulates in the bottom of the tank where it serves no useful purpose and takes up space which is needed for the compressed air. It is also objectionable for the reason that it may flow from the tank into the air lines leading to various devices which are meant to receive only compressed air. On aircraft using compressed air systems for actuation of various devices there is a good chance that liquid in the air storage tank will enter the various air lines, because of the fact that the aircraft is subject to extremes of sudden movement and change of direction. The liquid is also very likely to freeze at altitudes where low temperatures are encountered, or even on the ground in cold climates. Freezing of liquid in the supply lines may then result in failure of one or more operating components, such as the landing gear retracting mechanism, bomb bay door operators, wing flap actuators and various other servomotors and air operated instruments.

As the liquid level in the tank 1 rises to a point where it covers the lower end portions of the apertures 12 and 13, the passage of air through the Venturi creates a suction in the sloping passage 22 strong enough to draw liquid into the central passage 17. This liquid is then carried along the passage 17 by the flowing air and soon reaches the restricted portion or constriction 19. When this occurs the flow of air is impeded, causing a rise in air pressure in front of the member 15 thus forcing it inwardly against the pressure of the spring 16. The spring being capable of exerting only light pressure on the member 15, it requires very little counterpressure to move the member 15 inwardly. Inward travel of the member 15 is stopped at just the right position to cause the annular groove 21 in member 15 to connect the aperture 13 with the liquid outlet passage 9. Since the pressure within the tank 1 is greater than outside the tank, liquid will flow through aperture 13, groove 21, groove 11 and passage 9 to be expelled into the atmosphere. This action will continue as long as the constriction 19 in passage 17 continues to receive liquid from the tank and the member 15 remains at or near its inward limit of travel. The constriction 19 may occasionally be cleared suddenly of all liquid by the inward flow of air or inadequate flow of liquid to the Venturi 18, thus reducing the air pressure in front of member 15 and acting to return the member to the position of Fig. 1. However as soon as the constriction 19 again receives liquid, the air pressure in front of member 15 will rise and member 15 will be pushed inwardly to the liquid extraction position. This intermittent action is most likely in aircraft installations because continual motion of the aircraft will disturb the liquid accumulation in tank 1, causing the liquid to splash and slop around very freely within the tank thus preventing steady liquid flow through the apertures 12 and 13. While the relative position of the tank with respect to the earth will influence the operation of the valve, there are no float devices or other complicated mechanism to be worn out or broken by continual jarring and virbration. Outside of clogging of the various liquid passages by dirt or other solid material there is no way for the valve device to get out of order or out of adjustment.

For a detailed description of an alternative valve construction, reference is made to Fig. 2 wherein there is shown the lower portion of a gas storage tank 1' which is adapted to contain compressed air or other gas under pressure and in which there is an accumulation of liquid 4'. The liquid extraction assembly comprises three interconnected valve units 30, 31 and 32. The first is a Venturi or gas inlet unit, the second is a valve actuating unit and the third is a liquid extraction unit. These units 30, 31 and 32 are attached to the tank walls in the relative positions shown by any suitable means such as welding or brazing. These separate units will now be described in detail.

The Venturi or gas inlet unit 30 comprises a tubular member 33 which is connected at one end to the gas input line 34. The interior of the member 33 is formed with a Venturi throat 35 and with a constriction 36 inwardly of the Venturi. Unlike the valve shown in Fig. 1, the constriction 36 of Fig. 2 is formed with converging and diverging walls on the inlet and outlet sides of the constriction but may have various shapes, or may even be in the form of a series of closely spaced restricted openings. The important consideration is the relative cross sectional area of the passage at the constriction. Instead of a single opening at the constriction it is also possible to use several smaller openings and in this case the constriction may comprise merely a circular plug having several small caliber openings drilled therethrough and being mounted snugly within the central passage of the member 33. This sieve-like arrangement is efficient but it has the disadvantage of being more likely to clog up with dirt and congealed oil. The rate of gas or air flow into the member 33 measured in units of volume is never very high after the tank has been brought up to somewhere near the normal operating pressure range, and thus the resistance to normal air flow offered by the Venturi 35 and restriction 36 is not significant. The air supply passing through member 33 and into the tank 1 is generally from a multi-stage compressor in which the last stage pumps a very small volume at a very high pressure. Connected to the Venturi throat is a passage or tube 37 adapted to convey liquid to the Venturi when the liquid level rises high enough to reach the lower end of the tube.

The valve actuating unit 31 comprises a casing or cylinder 38 partially closed at its inner end by a cap 39 which is provided with an opening 40. The inside of the cylinder 38 is circumferentially grooved as at 41, 42, 43 and 44. The latter groove 44 communicates with the inside of the tank by means of an aperture 45. The grooves 41 and 43 communicate with an actuating line 46 by means of passages 47 and 48. The groove 42 communicates with the atmosphere through a tube 49. Also the outward end of the cylinder 38 is connected to the interior of the tubular member 33 just forwardly of the restriction 36 by means of a tube 50. Slidably mounted in the cylinder 38 there is a valve member or piston 51 which is circumferentially grooved at 52 and 53, and is normally retained in the outward position as shown by means of a coil spring 54. Endwise travel of the piston 51 is limited by the screw or pin 55 extending through the wall of cylinder 38 and fitting into the longitudinal groove 56 formed in piston 51.

The liquid extraction unit 32 is retained in the relative position as shown by means of struts 57 which attach to a liquid drain conduit 58 carried on a flange 59 integral with the bottom wall of tank 1'. The unit 32 comprises a cylinder 60 connected at the lower end to the valve actuating line 46, and near the upper end is connected by a tube 61 to the atmosphere. Slidably mounted in the cylinder is a piston 62 rigidly connected by a valve stem 63 to a liquid drain valve or poppet 64, which normally closes an outlet 65 in the bottom wall of tank 1'. The valve 64 is normally held in the closed position by means of a coil spring 66 surrounding valve stem 63 as well as by pressure in the tank acting on the poppet 64. As may be seen in Fig. 2 the relative size and position of the cylinder 60 is such as to permit liquid escaping from the valve 64, 65 to gravitate downwardly in the conduit 58 and be carried away thereby.

Considering the operation and coaction of the three units above described, it will be seen that the liquid 4' will accumulate in the bottom of tank 1' until it reaches the lower end of tube 37. At this time the tube will draw liquid by virtue of its connection with the Venturi throat 35 through which air may be assumed to be passing on its way to the storage tank. The liquid which reaches the Venturi will be carried inwardly by the air and in so doing will tend to impede the flow of air through the constriction 36. This will increase the air pressure in front of the piston 51 of unit 31 causing the piston to move inwardly against the pressure of spring 54. As the piston 51 reaches the inward limit of its travel a connection is made from the interior of tank 1' to the lower end of the cylinder 60 of unit 32, by means of aperture 45, groove 53, tube 48 and line 46. The resulting pressure on the piston 62 will compress spring 66 and open the valve 64, 65. Liquid will now rush past the valve due to air pressure thereon and the liquid is thus removed from the tank 1'. The tube 61 extending into the cylinder 60 is for the purpose of preventing resistance to upward movement of the piston 62. Furthermore it is noted that the area of cross section of the valve actuating piston 62 is made considerably greater than the area of the upper face of valve member 64 in order that the air pressure applied to the piston will be effective to open the valve 64, 65 against the pressure in tank 1'. After the liquid level drops below the lower end of tube 37 no more liquid is drawn into the Venturi throat 35 by the aspirating action thereof. The restriction 36 in member 33 will then be cleared of liquid and the pressures on both ends of the piston 51 of unit 31 will become about equal. Piston 51 will now return to the position of Fig. 2 under the force of spring 54 thus closing off the tube 48 leading to line 46. Simultaneously the atmospheric line 49 is connected to tube 47 and line 46 by the groove 52, in piston 51. The piston 62 of unit 32 now having atmospheric pressure on both ends thereof, the piston will move down under the pressure of spring 66 thus closing the liquid extraction valve. The valve or poppet 64 is maintained tightly closed by pressure in the tank, as previously described. The various effects of one unit on the others will of course take place quite rapidly, depending merely on inertia of the moving parts as well as friction between relatively sliding members. It should be understood that the units 30 and 31 may be combined in a unitary structure if desired, the presently illustrated arrangement being shown merely by way of example. Furthermore the unit 32 may be mounted within the tank 1' as long as the required air connections are made to the cylinder 60, and provided the air pressure is not permitted to build up in the cylinder 60 by air leaking into the cylinder from the tank, around the valve stem 63.

In both forms of the liquid extraction valve the structures described have particular utility on aircraft for reasons stated above, and also because the valve will remain in closed position during any extreme or unusual flight attitude. Thus there will be no liquid flow from the tank or reservoir and as a result any possible escape of compressed gas by way of the liquid extraction passages will be prevented. The reason the valve remains closed as stated is that during unusual flight maneuvers the liquid within the reservoir will generally occupy a portion of the reservoir spaced from the valve assembly and liquid inlet portions thereof.

In the present description of the invention it was assumed that the liquid extraction valves would be best adapted for use in compressed gas reservoirs. However it should be understood that the valves may also be used in steam systems where it is desired to periodically remove or extract condensed steam which may collect in a reservoir or trap comparable to the tank 1 or 1' of Fig. 1 or Fig. 2. Thus since steam is the vapor phase of water it may be considered to constitute a gas within the broadest meaning of the term.

While the present invention has been described with reference to two embodiments thereof it is thought to be obvious that the mode of operation and the construction of the essential elements are substantially the same in both illustrated embodiments. The embodiments of the invention herein shown and described are to be regarded as illustrative only and it is to be understood that the invention is susceptible to variations, modifications and changes within the scope of the appended claims.

We claim:

1. In a liquid extraction device for use in a compressed gas reservoir, a tubular member adapted to be mounted adjacent to a wall of said reservoir and providing a conduit for gas from a source of compressed gas into said reservoir, a Venturi formation in said tubular member adjacent to the end connected to said source of compressed gas, means providing a passage from the throat of said Venturi formation to a liquid inlet positioned near the bottom of said reservoir, a constriction in said tubular member adjacent to the opposite end thereof and adapted to provide opposition to the inflow of gas to said reservoir when liquid reaches said constriction by way of said passage, said Venturi throat, and a portion of said tubular member, means providing a passage for liquid from a point near the bottom of said reservoir to the outside of said reservoir, valve means forming a portion of the latter passage, and actuating means for said valve means responsive to pressure increase in said tubular member caused by liquid reaching said constriction to open said valve means and said latter passage.

2. In a liquid extraction device for use in a compressed gas reservoir, a tubular member adapted to be mounted adjacent to a wall of said reservoir and providing a conduit for gas from a source of compressed gas into said reservoir, means enclosing said member and mounting the same for limited movement, a Venturi formation in said tubular member adjacent to the end connected to said source of compressed gas, means providing a passage from the throat of said Venturi formation to a liquid inlet positioned near the bottom of said reservoir, a constriction in said tubular member adjacent to the opposite end thereof and adapted to provide opposition to the inflow of gas to said reservoir when liquid reaches said constriction by way of said passage, said Venturi throat, and a portion of said tubular member, means providing a passage for liquid from a point near the bottom of said reservoir to the outside of said reservoir, valve means including said member and forming a portion of the latter passage, the pressure increase in said tubular member enclosing means caused by liquid reaching said constriction providing an actuating force to move said member to a position for opening said valve means and said latter passage, and spring means to normally bias said tubular member away from the position aforesaid to another position wherein said valve means is closed.

3. In a liquid extraction device for use in a compressed gas reservoir, a tubular member adapted to be mounted adjacent to a wall of said reservoir and providing a conduit for gas from a source of compressed gas into said reservoir, a Venturi formation in said tubular member adjacent to the end connected to said source of compressed gas, means providing a passage from the throat of said Venturi formation to a liquid inlet positioned near the bottom of said reservoir, a constriction in said tubular member adjacent to the opposite end thereof and adapted to provide opposition to the inflow of gas to said reservoir when liquid reaches said constriction by way of said passage, said Venturi throat, and a portion of said tubular member, a first valve positioned adjacent the bottom of said reservoir and adapted to allow escape of liquid from the reservoir to the outside when open, fluid pressure responsive actuating means for said valve, a second valve actuated by a pressure increase in said tubular member caused by liquid reaching said constriction and adapted to connect the interior of said reservoir to said fluid pressure responsive actuating means, thus opening said first valve to drain at least a portion of the liquid from said reservoir.

4. In an automatic valve device, a tubular member adapted to provide a conduit for gas from a source of compressed gas, a Venturi formation in said tubular member adjacent to the end connected to said source of compressed gas, means providing a passage from the throat of said Venturi formation to a liquid inlet positioned within a liquid containing reservoir, a constriction in said tubular member adjacent to the opposite end thereof adapted to provide opposition to the flow of gas through said tubular member when liquid reaches said constriction by way of said passage, said Venturi throat, and a portion of said tubular member, means providing a passage for liquid from the inside to the outside of said reservoir, valve means forming a portion of the latter passage, and actuating means for said valve means responsive to arise in liquid level in said reservoir to said liquid inlet and a consequent pressure increase in said tubular member caused by liquid reaching said constriction to open said valve means and said latter passage.

5. In an automatic valve device, a tubular member adapted to provide a conduit for gas from a source of compressed gas, a tubular means enclosing said member and mounting the same for limited sliding movement, a Venturi formation in said tubular member adjacent to the end nearest the source of compressed gas, means including a transverse opening in said tubular member to provide a passage from the throat of said Venturi formation to a liquid inlet positioned within a liquid containing reservoir, a constriction in said tubular member adjacent to the opposite end thereof adapted to provide opposition to the flow of gas through said tubular member when liquid reaches said constriction by way of said passage, said Venturi throat, and a portion of said tubular member, means providing a passage for liquid from the inside to the outside of said reservoir, valve means including said member and said tubular enclosing means and forming a portion of the latter passage, the pressure increase in said tubular enclosing means caused by liquid reaching said constriction providing an actuating force to slide said member to a position for opening said valve means and said latter passage.

6. In an automatic valve device, a tubular member adapted to provide a conduit for gas from a source of compressed gas, a tubular means enclosing said member and mounting the same for limited endwise sliding movement, one end of said tubular means and a corresponding end of said tubular member providing an inlet for gas from said source of compressed gas, the other end of said tubular means being apertured for the passage of gas from said automatic valve device, spring means in said tubular means normally biasing said tubular member away from said other end, a Venturi formation in said tubular member adjacent to the inlet end thereof, means including adjacent transverse openings in the walls of said tubular member and said tubular means to provide a passage from the throat of said Venturi formation to a liquid inlet positioned within a liquid containing reservoir, a constriction in said tubular member adjacent to the end opposite to said inlet end to provide opposition to the flow of gas through said tubular member when liquid reaches said constriction by way of said passage, said Venturi throat, and a portion of said tubular member, means providing a passage for liquid from the inside to the outside of said reservoir, valve means including said tubular member and said tubular means and forming a portion of the latter passage, the pressure increase in said tubular enclosing means at the inlet end caused by liquid reaching said constriction providing an actuating force to slide said member against the force of said spring means to a position for opening said valve means and said latter passage.

7. In an automatic valve device, a tubular member connected to a source of compressed gas at one end and opening into a gas receiver or other container at the other end, a Venturi formation in said tubular member adjacent to the end connected to said source of compressed gas, means providing a passage from the throat of said Venturi formation to a liquid inlet adapted to receive liquid intermittently, throttling means in said tubular member adjacent to the other end thereof adapted to provide opposition to the flow of gas through said tubular member when liquid reaches said latter means by way of said passage, said Venturi throat, and a portion of said tubular member, means forming part of said valve device to provide a fluid passage, a movable element forming a portion of the latter passage, and actuating means for said movable element responsive to liquid reaching said liquid inlet and a consequent pressure increase in said tubular member caused by liquid reaching said throttling means to actuate said movable element.

8. In a liquid extraction device for use in a compressed gas reservoir, a tubular member adapted to be mounted adjacent to a wall of said reservoir and providing a conduit for gas from a source of compressed gas into said reservoir, a Venturi formation in said tubular member adjacent to the end connected to said source of compressed gas, means providing a passage from the throat of said Venturi formation to a liquid inlet positioned near the bottom of said reservoir, a constriction in said tubular member adjacent to the opposite end thereof and adapted to provide opposition to the inflow of gas to said reservoir when liquid reaches said constriction by way of said passage, said Venturi throat, and a portion of said tubular member, means providing an escape passage for liquid from a point near the bottom of said reservoir to the outside of said reservoir, and means responsive to pressure increase in said tubular member caused by liquid reaching said constriction to open said escape passage and cause liquid to flow to the outside of said reservoir under action of the pressure of said compressed gas in said reservoir.

9. In an automatic valve device, a tubular member for connection to a source of compressed gas at one end and opening into a gas receiver at the other end, housing means for said tubular member and mounting the same for limited movement, a Venturi formation in said tubular member adjacent to the end connected to said source of compressed gas, means including a transverse opening said tubular member to provide a passage from the throat of said Venturi formation to a liquid inlet adapted to receive liquid intermittently from accumulations thereof within said gas receiver, throttling means in said tubular member adjacent to the other end thereof adapted to provide opposition to the flow of gas through said tubular member when liquid reaches said latter means by way of said passage, said Venturi throat and a portion of said tubular member, means including an annular groove in said tubular member to provide a fluid conduit from the inside to the outside of the gas receiver when said tubular member is moved to a conduit-opening position in the housing means by pressure increase on the end of said member connected to said source of compressed air due to liquid reaching said throttling means, and a spring in said housing means adapted to normally bias said tubular member to a conduit-closing position as said pressure increase diminishes due to said throttling means being cleared of liquid.

10. In a liquid extraction device for use in a compressed gas reservoir, a tubular member adapted to be mounted on a wall of said reservoir and providing a conduit for gas from a source of compressed gas into said reservoir, a Venturi formation in said tubular member adjacent to the end connected to said source of compressed gas, means providing a passage from the throat of said Venturi formation to a liquid inlet positioned near the bottom of said reservoir, a constriction in said tubular member adjacent to the opposite end thereof and adapted to provide opposition to the inflow of gas to said reservoir when liquid reaches said constriction by way of said passage, said Venturi throat, and a portion of said tubular member, a drain valve at the bottom of said reservoir normally closed by a spring, and adapted to allow escape of liquid from the reservoir to the outside when open, fluid pressure responsive actuating means for said drain valve, a control valve normally closed by a spring and actuated to open position by a pressure increase in said tubular member caused by liquid reaching said constriction and when open serving to connect the interior of said reservoir to said fluid pressure responsive actuating means, to thereby open said drain valve and cause at least part of the liquid to flow to the outside of said reservoir.

ROBERT R. BAYUK.
JOSEPH A. MILETI, Jr.

REFERENCES CITED

The following references are of record in the file of this patent:

UNITED STATES PATENTS

| Number | Name | Date |
|---|---|---|
| 2,349,938 | Burnette | May 30, 1944 |